United States Patent
Bruns

(10) Patent No.: US 9,505,319 B2
(45) Date of Patent: Nov. 29, 2016

(54) MOTOR VEHICLE

(71) Applicant: Bayerische Motoren Werke Aktiengesellschaft, Munich (DE)

(72) Inventor: Hans-Heiner Bruns, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/802,380

(22) Filed: Jul. 17, 2015

(65) Prior Publication Data

US 2015/0321580 A1 Nov. 12, 2015

Related U.S. Application Data

(63) Continuation of application No. PCT/EP2014/050827, filed on Jan. 16, 2014.

(30) Foreign Application Priority Data

Jan. 18, 2013 (DE) .......................... 10 2013 200 812

(51) Int. Cl.
*B60N 2/01* (2006.01)
*B60R 21/207* (2006.01)
(Continued)

(52) U.S. Cl.
CPC ............... *B60N 2/01* (2013.01); *B60N 2/0232* (2013.01); *B60N 2/16* (2013.01); *B60N 2/2893* (2013.01); *B60N 2/449* (2013.01); *B60N 2/4415* (2013.01); *B60N 2/646* (2013.01); *B60R 21/207* (2013.01);
(Continued)

(58) Field of Classification Search
CPC ...... B60N 2/01; B60N 2/646; B60N 2/4415; B60N 2/2893; B60N 2/449; B60N 2/16; B60N 2/0232; B60N 2002/022; B60R 21/207; B60R 22/26; B60R 2021/2078; B60R 2022/266

See application file for complete search history.

(56) References Cited

U.S. PATENT DOCUMENTS 6,220,669 B1 4/2001 Frohnhaus et al.
7,341,302 B2 * 3/2008 Slade ..................... B60N 2/062
296/65.01

(Continued)

FOREIGN PATENT DOCUMENTS

DE 36 21 642 C2 8/1987
DE 42 44 377 A1 6/1994
(Continued)

OTHER PUBLICATIONS

International Search Report (PCT/ISA/210) dated Apr. 3, 2014, with English translation (Four (4) pages).
(Continued)

*Primary Examiner* — Drew Brown
(74) *Attorney, Agent, or Firm* — Crowell & Moring LLP

(57) ABSTRACT

A motor vehicle is provided which has a rear seat row, wherein the rear seat row can be changed such that at least three child seats can be arranged on the rear seat row. Two seat surfaces can be displaced from a lowered position into a raised position and back, and two optionally present lateral support members can be moved from a raised position into a lowered position. A middle seat surface portion can be moved from a raised position into a lowered position. The upwardly directed outer surfaces of the side members, the upwardly directed outer surfaces of the seat surfaces and the upwardly directed outer surface of the middle seat surface portion form a flat bench seat surface of the rear seat row.

5 Claims, 3 Drawing Sheets

(51) Int. Cl.
*B60N 2/64* (2006.01)
*B60N 2/02* (2006.01)
*B60N 2/16* (2006.01)
*B60N 2/28* (2006.01)
*B60N 2/44* (2006.01)
*B60R 22/26* (2006.01)

(52) U.S. Cl.
CPC ......... *B60R 22/26* (2013.01); *B60N 2002/022* (2013.01); *B60R 2021/2078* (2013.01); *B60R 2022/266* (2013.01)

(56) References Cited

U.S. PATENT DOCUMENTS

| | | | |
|---|---|---|---|
| 2007/0158979 | A1 | 7/2007 | Saberan et al. |
| 2007/0200384 | A1* | 8/2007 | Schwingenschloegel ................. B60N 2/01 296/64 |
| 2009/0309402 | A1 | 12/2009 | Rehfuss |
| 2013/0134756 | A1* | 5/2013 | Hisamoto ............ B60N 2/1615 297/313 |
| 2013/0161989 | A1* | 6/2013 | Ito ........................ B60N 2/1615 297/313 |
| 2015/0108800 | A1* | 4/2015 | Renaudin ................. B60N 2/16 297/256.11 |

FOREIGN PATENT DOCUMENTS

| | | |
|---|---|---|
| DE | 197 58 497 C2 | 5/1999 |
| DE | 100 56 960 A1 | 5/2002 |
| DE | 10 2006 059 722 A1 | 7/2007 |
| DE | 10 2007 037 378 A1 | 2/2009 |
| DE | 10 2007 045 552 A1 | 4/2009 |
| DE | 10 2008 028 353 A1 | 12/2009 |
| DE | 10 2008 043 617 A1 | 5/2010 |
| EP | 0 979 752 A2 | 2/2000 |
| FR | 2 693 688 A1 | 1/1994 |
| FR | 2 961 760 A1 | 12/2011 |
| GB | 2 304 566 A | 3/1997 |
| WO | WO 2012/163889 A1 | 12/2012 |

OTHER PUBLICATIONS

German Search Report dated Jun. 5, 2013, with English translation (Ten (10) pages).

* cited by examiner

MOTOR VEHICLE

CROSS REFERENCE TO RELATED APPLICATIONS

This application is a continuation of PCT International Application No. PCT/EP2014/050827, filed Jan. 16, 2014, which claims priority under 35 U.S.C. §119 from German Patent Application No. 10 2013 200 812.0, filed Jan. 18, 2013, the entire disclosures of which are herein expressly incorporated by reference.

BACKGROUND AND SUMMARY OF THE INVENTION

The invention relates to a motor vehicle having a body which has a passenger cell with a vehicle interior, wherein, on a floor of the vehicle interior, there are provided at least one front seat and at least one rear seat row. The respective rear seat row has at least two seating positions, wherein each respective seating position is composed of a seat base part with seat base surface and of a backrest part with backrest surface. In each case, one lateral support is formed on the lateral ends of the rear seat row, and, in each case, one middle seat base surface section is formed between two seat base surfaces.

DE 10 2006 059 722 A1 discloses a rear seat row with three seating positions. A middle seating position can be moved from a rear seat position into a front seat position.

DE 10 2008 028 353 A1 discloses a motor vehicle seat in which adjustable lateral supports are provided. Inflatable chambers are provided for the adjustment of the lateral supports.

DE 10 2007 037 378 A1 discloses a motor vehicle having a lateral support adjustment device. The adjustment of the lateral supports is performed by way of a respective adjustment element, which may be hydraulically, mechanically, pneumatically, electrically or magnetically actuated.

DE 10 2007 045 552 A1 discloses a motor vehicle seat in which at least one airbag is provided in the region of the lateral supports.

DE 42 44 377 A1 discloses a rear seat bench on which two child seats can be arranged. Between the two child seats there remains an intermediate space which cannot be used for a third child seat.

EP 0 979 752 A2 discloses a vehicle seat which has a so-called ISOFIX connection.

It is an object of the invention to provide a motor vehicle in which, in each case, three or more child seats can be arranged adjacent to one another on a second seat row and/or further rear seat row.

This and other objects are achieved by a motor vehicle according to the invention having a body which has a passenger cell with a vehicle interior. On a floor of the vehicle interior, there are provided at least one front seat and at least one rear seat row. The rear seat row has at least two seating positions. The seating positions provided on the rear seat row are composed in each case of a seat base part with seat base surfaces and of a backrest with backrest surfaces. In each case one lateral support is formed on lateral ends of the rear seat row, wherein in each case one middle seat base surface section is formed between the two seat base surfaces.

The two seat base surfaces can advantageously be displaced from a lowered position into a raised position and vice versa, wherein the two optionally provided lateral supports can be moved from a raised position into a lowered position and the middle seat base surface section can be moved from a raised position into a lowered position, such that the upwardly directed outer surfaces of the lateral supports, the upwardly directed outer surfaces of the seat base surfaces and the upwardly directed outer surface of the middle seat base surface section form a flat seat base surface of the seat bench.

In an advantageous embodiment, the seatbelt fasteners, the seat belts, the seatbelt retractors and the fastening devices for the child seats can be displaced from a respective position for a non-flat seat base surface into corresponding positions for a flat seat base surface of the seat bench, and vice versa.

In an advantageous embodiment, in each case at least one airbag is arranged in the optionally provided lateral supports.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a schematic view of a rear seat row corresponding to the embodiment in FIG. 1, wherein FIG. 3 shows the arrangement of three seatbelt retractors and correspondingly three seat belt fasteners, and ISOFIX fastening points for the arrangement of two child seats;

DETAILED DESCRIPTION OF THE DRAWINGS

Figure 1:
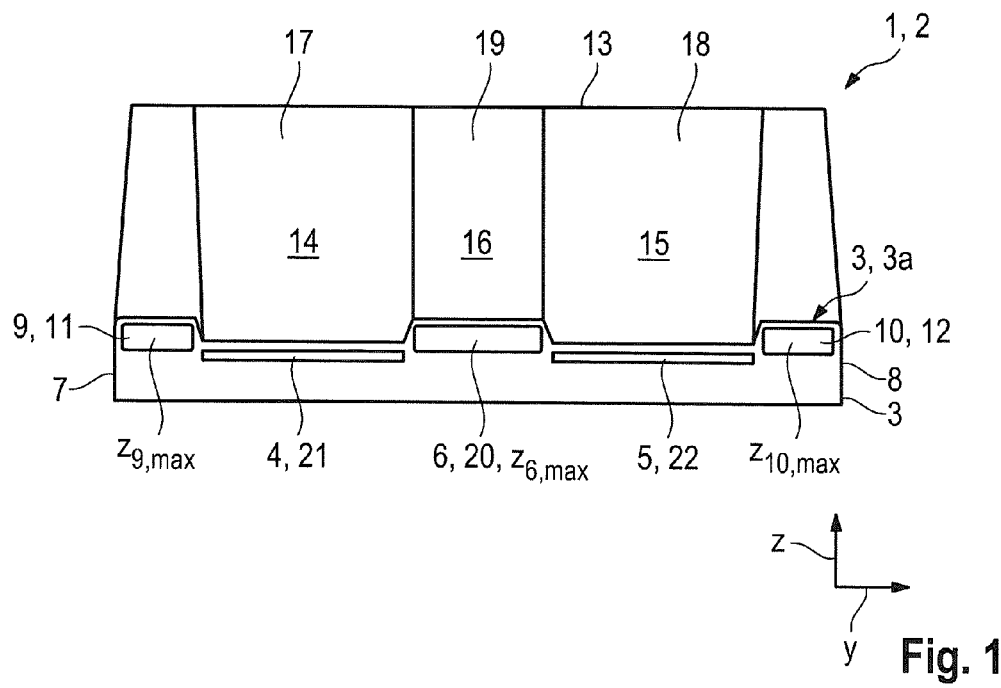
FIG. 1 is a schematic illustration of a rear seat row in which, owing to the formation of two sunken seat base surfaces, two child seats can be arranged.

FIG. 1 is a schematic illustration of a rear seat row 2 of a motor vehicle 1 (not illustrated in any more detail). In the embodiment shown, the rear seat row 2 is composed of a seat bench 3 with two sunken seat base surfaces 4 and 5. The two seat base surfaces 4 and 5 are spaced apart from one another by a middle seat base surface section 6. The middle seat base surface section 6 is generally narrower than the two seat base surfaces 4 and 5.

On the two lateral ends 7, 8 of the seat bench 3 there is formed a respective height-adjustable lateral support 9, 10. The seat bench 3 is adjoined by a backrest 13. The backrest 13 may be of dividable or non-dividable form.

In the embodiment shown, the respective seat base surface 4 and 5 of the seat bench 3 is assigned a respective backrest surface 14, 15 of the backrest 13. The middle seat base surface section 6 is assigned a backrest surface 16. This yields two outer, lateral seats 17 and 18 and a middle seat 19. Arrangement of child seats is possible only on the two sunken seat base surfaces 4 and 5.

In FIG. 1, the two lateral supports 9, 10 are, in each case, situated in a maximally raised or upwardly adjustable position 11, 12, and the middle, height-adjustable seat base surface section 6 has also been adjusted into a maximally raised position 20. In FIG. 1, the two seat base surfaces 4 and 5 are, in each case, situated in a maximally lowered position 21 and 22. The seat bench 3 thus has a non-flat seat base surface 3a.

Figure 2:
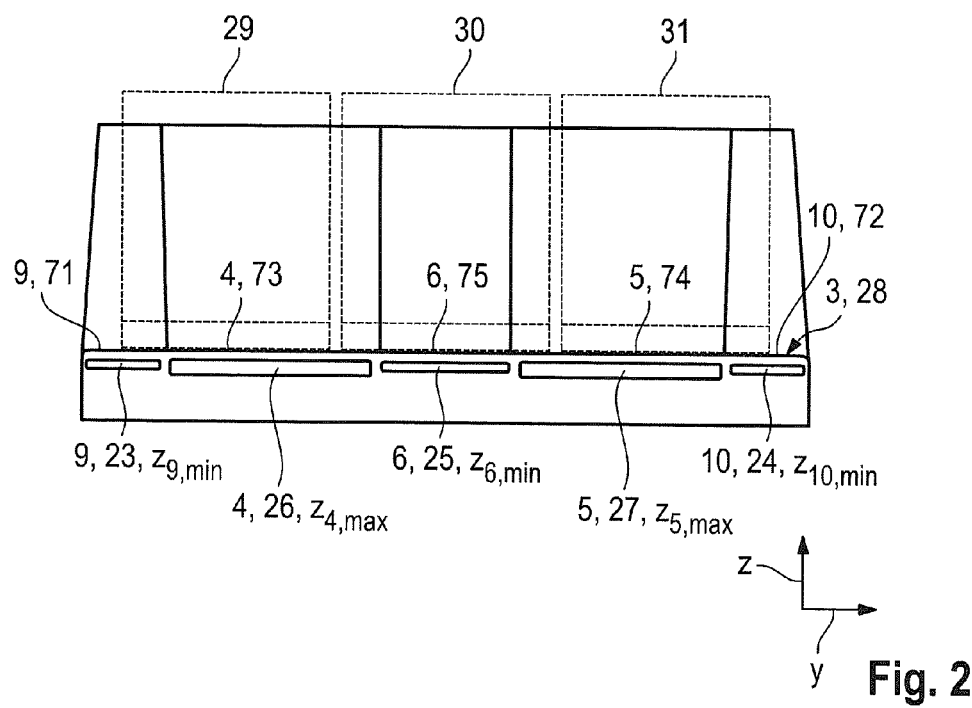
FIG. 2 is a schematic view of a rear seat row corresponding to FIG. 1, wherein, owing to the two sunken seat base surfaces having been raised to a common height, which gives rise to a flat seat base surface over the entire width of the rear seat row, the arrangement of three child seats is possible.

In FIG. 2, the seat base surfaces 4 and 5 that are shown have been displaced upward by a height $z_{4,max}$, $z_{5,max}$ by way of a raise/lower device (not illustrated), whereas the two lateral supports 9 and 10 and the middle seat base surface section 6 have been lowered by a height $z_{6,min}$, $z_{9,min}$, $z_{10,min}$ into a minimal position.

In FIG. 2, the two lateral supports 9 and 10 and the middle seat base surface section 6 are situated in a maximally lowered position 23, 24 and 25. The two seat base surfaces 4 and 5 have been displaced upward into a maximally raised position 26, 27.

The lowering of the two lateral supports 9, 10 and of the middle seat base surface section 6 and the raising of the two seat base surfaces 4 and 5 is performed so as to give rise to a flat seat base surface 28 of the seat bench 3, as shown in FIG. 2. On the flat seat base surface 28 of the seat bench 3, it is thus possible for three child seats 29, 30, 31 to be arranged adjacent to one another, as shown by dashed lines in FIG. 2.

Figure 3:
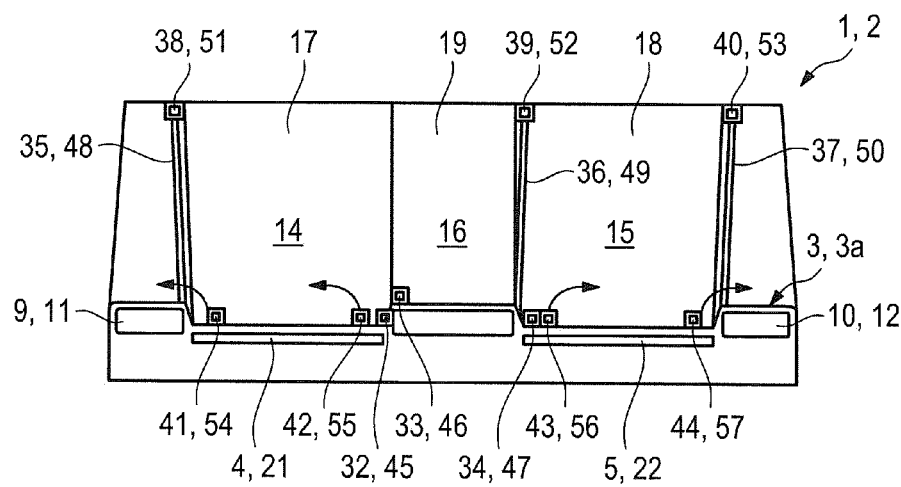
Figure 4:
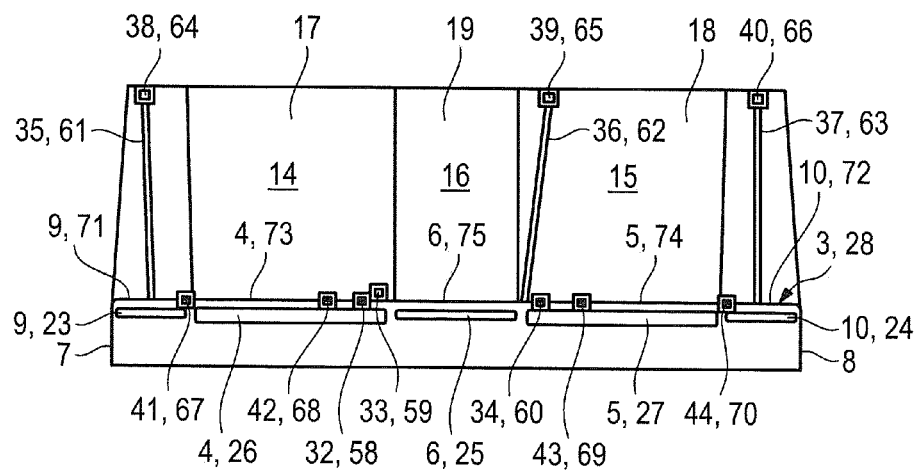
FIG. 4 is a schematic illustration of a rear seat row corresponding to FIG. 2, wherein, in FIG. 4, in each case the two ISOFIX fastening points for the child seat have been displaced in each case outward and upward, and wherein the three seatbelt fasteners have, in terms of their position, been raised and displaced laterally such that a child seat arranged in the middle can be fastened by way of the middle seatbelt and the associated seatbelt fastener.
Figure 5:
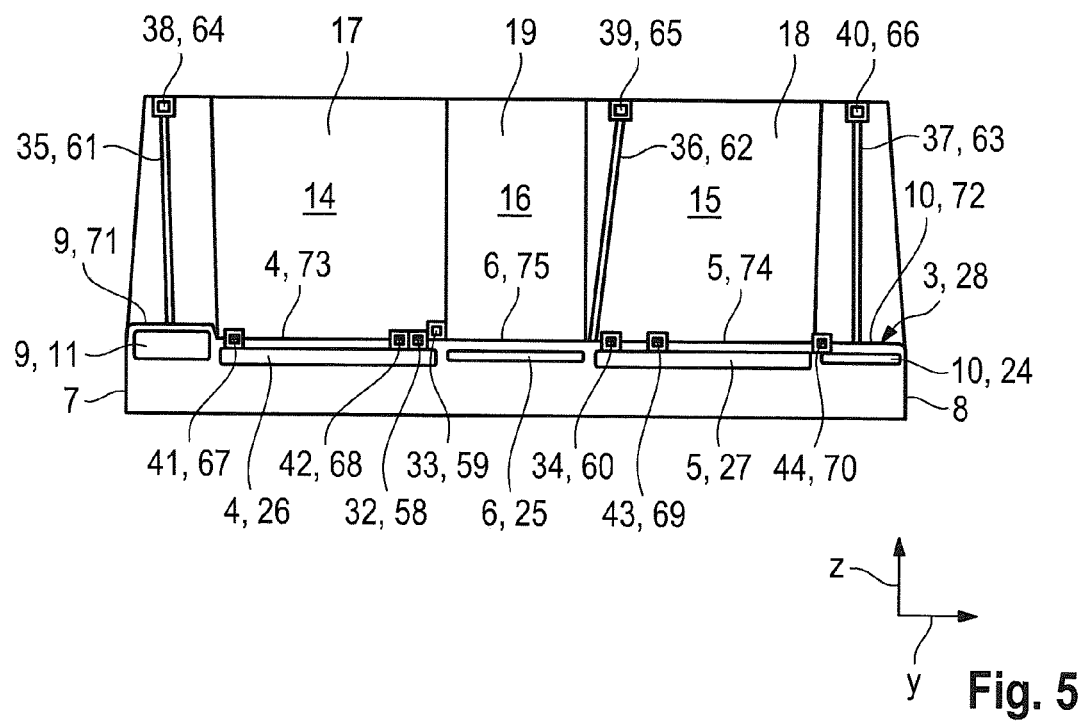
FIG. 5 is a schematic illustration of a rear seat row corresponding to FIG. 4, wherein, in addition to the arrangement shown in FIG. 4, a left-hand lateral support has been raised as a result of a side-on impact.

FIGS. 3 to 5 show the arrangement and displaceability of the three provided seatbelt fasteners 32, 33, 34 for the three seatbelts 35, 36, 37 and the three seatbelt retractors 38, 39, 40 for the three seatbelts 35, 36, 37. Furthermore, FIGS. 3 to 5 show a displaceability of, in each case, two (ISOFIX) fastening points 41, 42 and also 43 and 44.

FIG. 3 shows a state in which the two seat base surfaces 4 and 5 are situated in the lowered position 21, 22 corresponding to FIG. 1. When the seat base surfaces 4 and 5 are raised into the respective maximally raised position 26, 27 shown in FIG. 2, with the lateral supports 9, 10 simultaneously being lowered into the lowermost position 23, 24, the seatbelt fasteners 32, 33, 34 are displaced in terms of position, the seatbelts 35, 36, 37 are displaced in terms of position, the seatbelt retractors 38, 39, 40 are displaced in terms of position, and the ISOFIX fastening devices 41, 42 and 43, 44 are displaced in terms of position from the respective positions 45, 46, 47 shown in FIG. 3 for the seatbelt fasteners 32, 33, 34, from the respective positions 48, 49, 50 shown in FIG. 3 for the seatbelts 35, 36, 37, from the respective positions 51, 52, 53 shown in FIG. 3 for the seatbelt retractors 38, 39, 40, and from the respective positions 54, 55 and 56, 57 shown in FIG. 3 for the ISOFIX fastening devices 43, 44 into the positions 58, 59, 60 shown in FIG. 4 for the seatbelt fasteners 32, 33, 34, into the respective positions 61, 62, 63 shown in FIG. 4 for the seat belts 35, 36, 37, into the respective positions 64, 65, 66 shown in FIG. 4 for the seatbelt retractors 38, 39, 40, and into the respective positions 67, 68 and also 69 and 70 shown in FIG. 4 for the respective (ISOFIX) fastening devices 41, 42 and also 43 and 44.

The upwardly directed outer surfaces 71, 72 of the lateral supports 9, 10, the upwardly directed outer surfaces 73, 74 of the seat base surfaces 4, 5 and the upwardly directed outer surface 75 of the middle seat base surface section 6 thus form a flat seat base surface 28 of the seat bench 3.

As is evident from a comparison of FIGS. 3 and 4, the seatbelt 35 is displaced to the left in the direction of the outer lateral end 7 of the seat bench 3. Correspondingly, the seatbelt fastener 32 moves to the left and upward by a predefined distance. The seatbelt retractor 38 likewise moves to the left.

The seatbelt 36 for the middle seat 19 moves to the right together with the seatbelt retractor 39. Correspondingly, the seatbelt fastener 33 is displaced to the left. The seatbelt 37 moves together with the seatbelt retractor 40 to the right. Correspondingly, the seatbelt fastener 34 moves upward. The fastening devices 41, 42 move to the left into a higher position.

The (ISOFIX) fastening devices 43, 44 move from the sunken positions 41, 42 and 43, 44 into the higher positions 67, 68 and 69, 70 and to the right, in the direction of the lateral end 8 of the seat bench 3, by a predefined distance.

FIG. 5 shows a state in which, by contrast to the state shown in FIG. 4, the left-hand lateral support 9 has, for example owing to a side-on impact, been activated and inflated or moved, and is thus situated in the raised position 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle interior with a floor, the motor vehicle comprising:
   a front seat provided on the floor of the vehicle interior;
   a rear seat row provided on the floor of the vehicle interior, the rear seat row comprising at least two seating positions each of which comprises a seat base part with a seat base surface and a backrest part with a backrest surface; and
   one lateral support formed on each lateral end of the rear seat row, the lateral supports being displaceable between a raised position and a lowered position, wherein
   one middle seat base surface section is formed between the two seat base surfaces of the two seating positions,
   the two seat base surfaces are displaceable between a lowered position and a raised position,
   the middle seat base surface section is moveable between a raised position and a lowered position,
   upwardly directed outer surfaces of the two seat base surfaces and the middle seat base surface section are configurable to form a flat seat base bench surface of the rear seat row, and
   upwardly directed outer surfaces of the lateral supports, together with the upwardly directed outer surfaces of the two seat base surfaces and the upwardly directed outer surface of the middle seat base surface section form the flat seat base bench surface of the rear seat row.

2. The motor vehicle according to 1, further comprising:
   seat belts having associated seat belt fasteners and seat belt retractors;
   fastening devices configured for child seats to be arranged in the motor vehicle, wherein
   defined ones of the seat belt fasteners, seat belts, seat belt retractors and fastening devices are displaceable between respective positions corresponding to a non-flat seat base bench surface of the rear seat row and corresponding positions for the flat seat base bench surface of the rear seat row.

3. The motor vehicle according to claim 2, wherein the seat belt fasteners, the seat belts, the seat belt retractors and the fastening devices are displaceable into the corresponding positions for the flat seat base bench surface such that three child seats are installable on the rear seat row.

4. The motor vehicle according to claim 1, further comprising:
    at least one air bag arranged in each one of the lateral supports.

5. The motor vehicle according to claim 2, further comprising:
    at least one air bag arranged in each one of the lateral supports.

* * * * *